US012562924B2

(12) United States Patent
Wang et al.

(10) Patent No.: US 12,562,924 B2
(45) Date of Patent: Feb. 24, 2026

(54) SYSTEMS AND METHODS FOR PROTECTING DATA

(71) Applicant: Google LLC, Mountain View, CA (US)

(72) Inventors: Gang Wang, Frederick, MD (US); Curtis Light, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/772,687

(22) Filed: Jul. 15, 2024

(65) Prior Publication Data

US 2024/0406012 A1    Dec. 5, 2024

Related U.S. Application Data

(63) Continuation of application No. 16/961,153, filed as application No. PCT/US2019/056277 on Oct. 15, 2019, now abandoned.

(51) Int. Cl.
*H04L 9/32*          (2006.01)
*H04L 9/08*          (2006.01)

(52) U.S. Cl.
CPC .......... *H04L 9/3271* (2013.01); *H04L 9/0825* (2013.01); *H04L 9/321* (2013.01); *H04L 9/3263* (2013.01)

(58) Field of Classification Search
CPC ............. H04L 63/0428; H04L 63/0869; H04L 63/107; H04L 9/0825; H04L 9/321;
(Continued)

(56) References Cited

U.S. PATENT DOCUMENTS 6,064,736 A * 5/2000 Davis ...................... G06F 21/31
                                                              380/30
6,105,066 A * 8/2000 Hayes, Jr. ............... H04L 67/34
                                                              709/224
(Continued)

FOREIGN PATENT DOCUMENTS

CN          103701596          4/2014
CN          105075176          11/2015
(Continued)

OTHER PUBLICATIONS

Extended European Search Report in European Appln. No. 22150492.1, mailed on Mar. 28, 2022, 8 pages.
(Continued)

*Primary Examiner* — Sharon S Lynch
(74) *Attorney, Agent, or Firm* — Fish & Richardson P.C.

(57)          ABSTRACT

Systems and methods are disclosed for protecting data. A device requesting access to the data is required to correctly respond to a challenge embedded in the data provided responsive to a request for the data. If the device that receives the data is able to generate the correct response to the challenge, the device can be validated as the device that was intended to receive the data. When the device is able to generate the correct response to the challenge, the correct response can indicate that the requested data is being used as intended. That is, the challenge can ensure that the context specified in the request, which was deemed an appropriate environment for use of the data by the server that triggered distribution of the data responsive to the request, is, in fact, the context in which the data is actually going to be used.

18 Claims, 6 Drawing Sheets

(58) Field of Classification Search
CPC .. H04L 9/3263; H04L 9/3271; H04W 12/033;
H04W 12/065; H04W 12/65
See application file for complete search history.

(56) References Cited

U.S. PATENT DOCUMENTS

| | | | | |
|---|---|---|---|---|
| 6,983,381 | B2 * | 1/2006 | Jerdonek | H04L 63/0272 |
| | | | | 726/5 |
| 7,676,042 | B2 * | 3/2010 | Okamoto | H04L 63/123 |
| | | | | 380/278 |
| 8,316,237 | B1 * | 11/2012 | Felsher | H04L 63/061 |
| | | | | 380/282 |
| 8,583,915 | B1 * | 11/2013 | Huang | H04L 9/3234 |
| | | | | 726/6 |
| 8,868,923 | B1 * | 10/2014 | Hamlet | G06F 21/00 |
| | | | | 326/8 |
| 9,143,496 | B2 * | 9/2015 | Etchegoyen | H04L 9/32 |
| 9,215,223 | B2 * | 12/2015 | Kirsch | G06F 21/31 |
| 9,251,334 | B1 * | 2/2016 | Molitor | H04L 9/3271 |
| 9,294,448 | B2 * | 3/2016 | Miller | H04L 9/3271 |
| 9,692,757 | B1 * | 6/2017 | Mikulski | H04L 9/3234 |
| 11,621,832 | B2 * | 4/2023 | Nix | H04W 12/03 |
| | | | | 713/171 |
| 2002/0095507 | A1 * | 7/2002 | Jerdonek | H04L 9/3215 |
| | | | | 713/168 |
| 2003/0041110 | A1 * | 2/2003 | Wenocur | H04L 63/126 |
| | | | | 709/206 |
| 2005/0289655 | A1 | 12/2005 | Tidwell et al. | |
| 2009/0010439 | A1 * | 1/2009 | Okamoto | H04L 63/08 |
| | | | | 380/279 |
| 2009/0210708 | A1 * | 8/2009 | Chou | H04L 9/3236 |
| | | | | 713/170 |
| 2013/0019293 | A1 * | 1/2013 | Puppin | G06Q 30/0601 |
| | | | | 726/7 |
| 2013/0046976 | A1 * | 2/2013 | Rosati | H04W 12/03 |
| | | | | 713/168 |
| 2013/0290719 | A1 | 10/2013 | Kaler et al. | |
| 2014/0040991 | A1 * | 2/2014 | Potonniee | H04L 63/06 |
| | | | | 726/4 |
| 2014/0136847 | A1 * | 5/2014 | Huang | H04L 9/3234 |
| | | | | 713/168 |
| 2014/0282933 | A1 * | 9/2014 | Etchegoyen | H04L 63/08 |
| | | | | 726/5 |
| 2015/0100789 | A1 * | 4/2015 | Born | G06F 21/60 |
| | | | | 713/170 |
| 2015/0350204 | A1 * | 12/2015 | Wang | H04L 63/0876 |
| | | | | 726/9 |
| 2018/0034822 | A1 | 2/2018 | Mistry | |
| 2018/0041484 | A1 * | 2/2018 | Gifford | H04L 9/3247 |
| 2018/0103037 | A1 | 4/2018 | Mullender et al. | |
| 2023/0208626 | A1 * | 6/2023 | Nix | H04L 9/3247 |
| | | | | 713/171 |

FOREIGN PATENT DOCUMENTS

| | | |
|---|---|---|
| CN | 105659559 | 6/2016 |
| CN | 108496329 | 9/2018 |
| CN | 109076075 | 12/2018 |
| CN | 109196509 | 1/2019 |
| CN | 109314708 | 2/2019 |
| JP | 2003-345707 | 12/2003 |
| JP | 2012-155397 | 8/2012 |
| JP | 2013-242851 | 12/2013 |
| KR | 10-2008-0104171 | 12/2008 |
| KR | 10-2018-0038151 | 4/2018 |
| WO | WO 2014153728 | 10/2014 |
| WO | WO 2016045746 | 3/2016 |
| WO | WO 2019026038 | 2/2019 |

OTHER PUBLICATIONS

International Preliminary Report on Patentability in International Appln. No. PCT/US2019/056277, mailed on Apr. 19, 2022, 8 pages.
International Search Report and Written Opinion in International Appln. No. PCT/US2019/056277, mailed on Mar. 20, 2020, 15 pages.
Notice of Allowance in Chinese Appln. No. 201980006842.9, mailed on Oct. 8, 2022, 6 pages (with English translation).
Notice of Allowance in Japanese Appln. No. 2020-535258, mailed on Aug. 1, 2022, 5 pages (with English translation).
Notice of Allowance in Korean Appln. No. 10-2022-7020735, mailed on Aug. 8, 2022, 7 pages (with English translation).
Notice of Allowance in Korean Appln. No. 10-2022-7020735, mailed on Jan. 26, 2023, 4 pages (with English translation).
Office Action in European Appln. No. 19802336.8, mailed on Jan. 7, 2022, 2 pages.
Office Action in European Appln. No. 19802336.8, mailed on Oct. 13, 2021, 7 pages.
Office Action in Japanese Appln. No. 2020-535258, mailed on Jan. 24, 2022, 6 pages (with English translation).
Office Action in Japanese Appln. No. 2022-137984, mailed on Aug. 28, 2023, 6 pages (with English translation).
Office Action in Korean Appln. No. 10-2020-7018319, mailed on May 23, 2022, 2 pages (with English translation).
Office Action in Korean Appln. No. 10-2020-7018319, mailed on Nov. 2, 2021, 7 pages (with English translation).
Office Action in Chinese Appln. No. 202211421333.2, mailed on Dec. 26, 2025, 33 pages (with English machine translation).

* cited by examiner

100
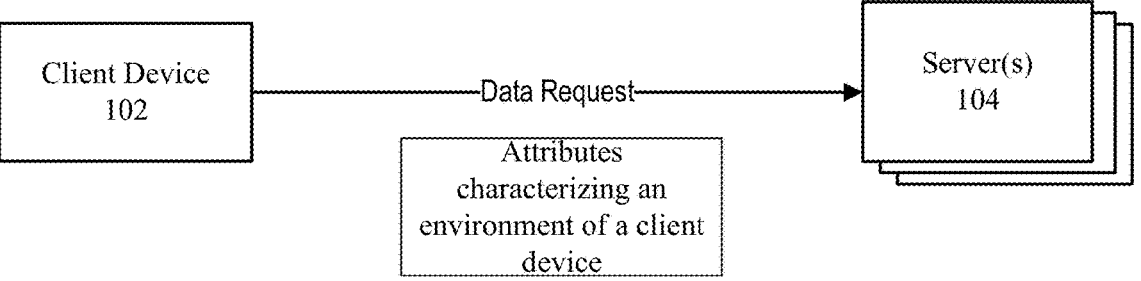
| Client Device 102 | —Data Request— | Server(s) 104 |
Attributes characterizing an environment of a client device
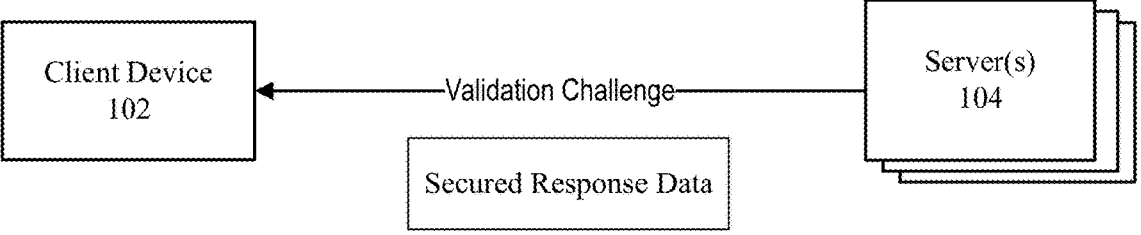
| Client Device 102 | ←Validation Challenge— | Server(s) 104 |
Secured Response Data
| Client Device 102 | | Server(s) 104 |
Application 106
FIG. 1

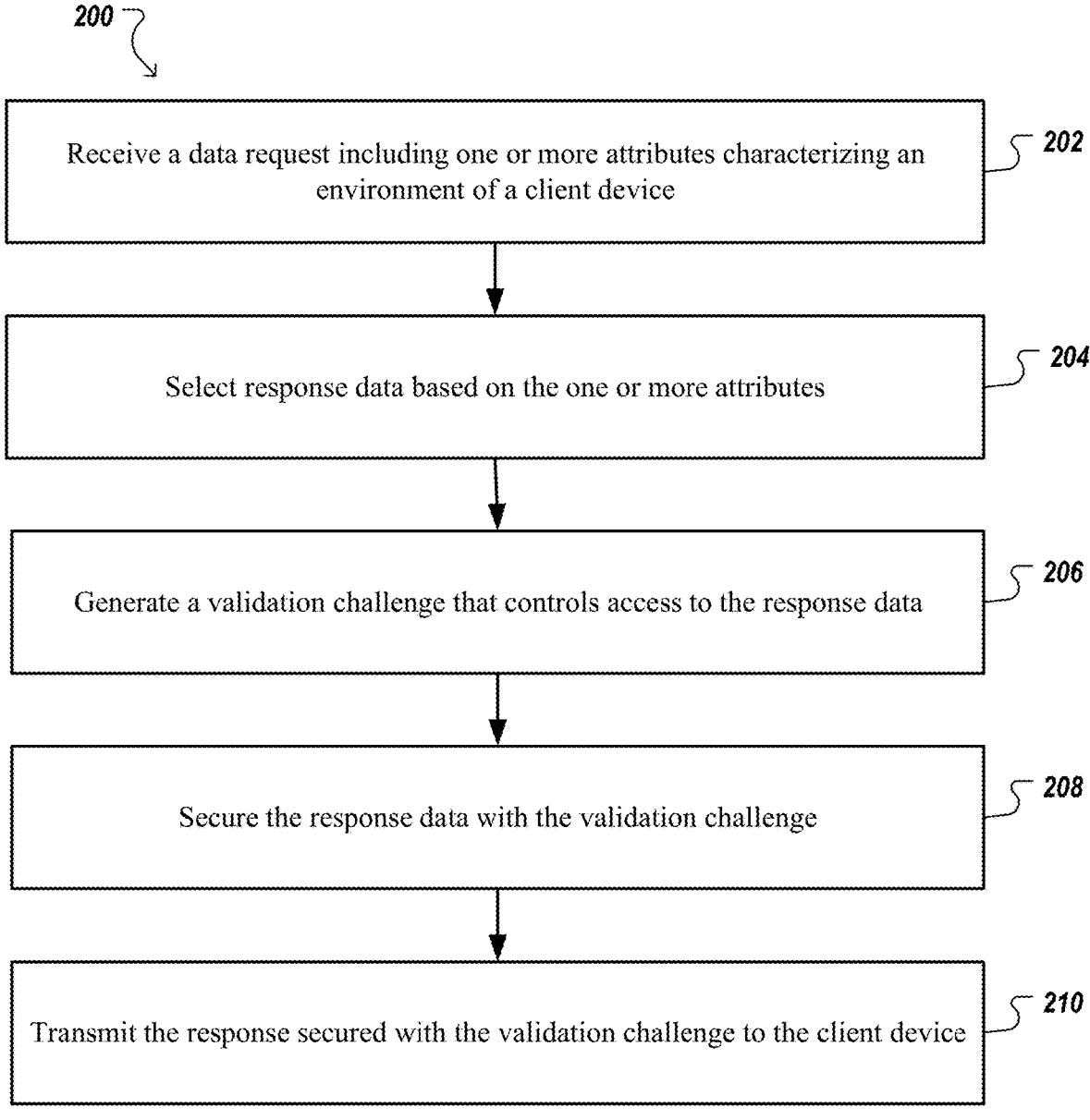

200

Receive a data request including one or more attributes characterizing an environment of a client device — 202

Select response data based on the one or more attributes — 204

Generate a validation challenge that controls access to the response data — 206

Secure the response data with the validation challenge — 208

Transmit the response secured with the validation challenge to the client device — 210

| Public Key | IP Address | URL | Application Name | Attribute 1 |
|------------|------------|-----|------------------|-------------|

402 Encrypted Unique Value

404 Expected Response

406 Response Data

408 Encrypted Attribute(s)

410 Other Data

502 — Receive data secured with a validation challenge

504 — Decrypt the validation challenge

506 — Validate the validation challenge

508 — Retrieve a unique value from the validation challenge

510 — Transform the unique value into a challenge answer

512 — Compare the challenge answer with an expected response

514 — Enact a rendering policy based on the comparing

SYSTEMS AND METHODS FOR PROTECTING DATA

CROSS-REFERENCE TO RELATED APPLICATIONS

This application is a continuation application and claims priority under 35 U.S.C. § 120 to U.S. patent application Ser. No. 16/961,153, filed on Jul. 9, 2020, which is a National Stage Application under 35 U.S.C. § 371 and claims the benefit of International Application No. PCT/US2019/056277, filed Oct. 15, 2019. The disclosure of the prior applications are considered part of and are incorporated by reference in the disclosure of this application.

BACKGROUND

The Internet has enabled access to a wide variety of data. In some situations, access to data can be limited, for example, by password protecting the data. Other techniques, such as encryption techniques, can also be used to restrict access to data.

SUMMARY

This document discusses techniques for protecting data. As discussed in detail throughout this document, data can be protected by requiring the device that receives the data (e.g., the device requesting access to the data) to correctly respond to (e.g., answer) a challenge embedded in the data provided responsive to a request for the data. If the device that receives the data is able to generate the correct response to the challenge, the device can be validated as the device that was intended to receive the data. Additionally, or alternatively, when the device is able to generate the correct response to the challenge, the correct response can indicate that the requested data is being used as intended, e.g., according to information received in the request for the data. For example, to generate the correct response to the challenge, the device receiving the data (e.g., not the user of the device) can be required to confirm that the context in which the data is actually being used matches a proposed context specified in the request for the data. In other words, the challenge can ensure that the context specified in the request, which was deemed an appropriate environment for use of the data by the server that triggered distribution of the data responsive to the request, is, in fact, the context in which the data is actually going to be used. This can prevent "spoofing" activities in which one device requests access to the data using appropriate contextual information within the request, and then forwards or otherwise redirects the data to an inappropriate environment after receiving the data.

In some implementations, a server receives a data request that includes one or more attributes characterizing an environment of a client device to which requested data will be provided. For example, the request can be a request for a digital component that will be incorporated into a resource with content distributed by a different entity (e.g., a web page or native application provided by an entity that differs from the entity that provides the digital component). In this example, the attributes characterizing the environment of the client device can specify a context in which the digital component will be presented. The context can at least be partially defined by an application or a web page in which the digital component will be incorporated for presentation. Various other information can be part of the request. For example, the request, instead of or in addition to the context information, can specify a location where a server can retrieve the context information. The one or more attributes can include any combination of a public key of a browser of the client device, a public key of the client device, an address of the client device, the server's cookie name and value, and an application name.

The server selects response data based on the received one or more attributes. In some implementations, the server can, for example, use context information from the request to select the digital component to be presented to a user in an application (e.g., based on type, name, or another characteristic of the application). In some implementations, response data is combined with a response script that is used to control access to the response data in combination with the validation challenge.

The server generates a validation challenge that controls access to the response data. That is, the client device is provided access to the response data when the client device's answer to the validation challenge correctly answers the validation challenge. The client device is prevented from accessing the response data when the client device's response to the validation challenge does not correctly answer the validation challenge. For example, the server can generate an encrypted unique value that only the client device can decrypt. In some implementations, one or more attributes characterizing the environment of the client device to which the requested data will be provided are used in generating the validation challenge. In a specific example, the one or more attributes of the request are also encrypted together with the unique value (e.g., using a public key of the client device). These attributes can be used by the client device to validate the server or servers behind the validation challenge. In some implementations, the response data itself can include encrypted data, such that even if the client device correctly answers the validation challenge, the client device will still need to be able to decrypt at least a portion of the response data to present the response data to the user. This extra encryption can prevent bypassing of the validation challenge to access the response data.

The server secures the response data with the validation challenge. For example, access to the selected digital component can be provided or prevented based on whether the receiving client device can decrypt and process the validation challenge as well as respond properly to that validation challenge. As discussed above, in some implementations at least a portion of the response data can be encrypted (e.g., for added security). In those implementations, the encrypted version of the response data is included in the validation challenge. The server can then transmit, to the client device, the validation challenge and response data to the original request. For example, the server can transmit a digital component to the client device together with the validation challenge. The digital component is secured in a way that the client device cannot access or present the digital component unless and until the client device correctly answers the validation challenge. For example, the digital component package can include executable code (e.g., a response script) that enables the client device to access the response data on the client device only when the client device generates a valid response to the validation challenge. Thus, the executable code enables rendering the digital component only after the validation challenge has been correctly answered.

In some implementations, the digital component package includes an expected response to the validation challenge (e.g., a cryptographic hash of a unique value generated by the server). The validation challenge can also include another copy of the unique value generated by the server but encrypted with the public key of the client device. In some implementations, in addition or instead of adding an expected response to the validation challenge, the server can encrypt at least a portion of the response data using a symmetric key encryption algorithm.

The client device receives the validation challenge and decrypts it, if, for example, that client device has the private key corresponding to the public key with which the validation challenge was encrypted. That is, if the validation challenge was encrypted by the public key of the client device, the client device can decrypt the validation challenge with its private key. When the validation challenge is decrypted, the client device retrieves the unique value from the digital component package and transforms the unique value into a challenge answer (e.g., generates a cryptographic hash of the unique value that was decrypted). For example, the client device can execute a cryptographic hash function such as a Secure Hash Algorithm (SHA) function against the unique value to generate a cryptographic hash. The client device can execute the response script (e.g., a digital component script) and submit, to the script, the generated challenge answer (e.g., a cryptographic hash of the unique value generated on the client device). The script compares the submitted hash with the expected response (e.g., the cryptographic hash generated on the server). If the hashes match, the client device accesses and renders the digital component. If the hashes do not match, access to the digital component is prevented.

The client device validates the validation challenge itself by comparing the decrypted one or more attributes received in the challenge with the one or more attributes of the original data request. If the attributes match, the client device submits the cryptographic hash of the unique value to the digital component script. If the attributes do not match, the client device can refrain from executing the response script. As mentioned above, a portion, or the entirety of the response data can be encrypted so that, for example, the digital component script cannot be bypassed to retrieve the response data. In those instances, when the client device determines that the hashes match, the client device can decrypt (using the response script) the response data and present the data to the user.

In some implementations, the request is not received from the client device itself, but from an intermediary server. In these implementations, the server can retrieve an address of the client device from the request and transmit the validation challenge with the response data to that address. This can be advantageous in instances when the response data is to be presented in an application, but the context information from within the application is not known to the user device but is known to an intermediary server of the application provider.

The disclosed data protection technique provides various advantages. For example, the disclosed data protection technique enables validation of the environment in which the requested data will be presented to the user. The validation is performed in such a way that the response to the request itself includes a way to validate the environment without needing extra communications between the client and the server. Moreover, this technique enables the client device to validate the data from the server to confirm that the request itself was sent by the client device or on behalf of the client device with appropriate environmental attributes for presenting response data.

Another advantage that the disclosed data protection technique provides is in an attack and/or fraud attempt by an intermediary server. For example, when the response data is transmitted from the server to the client device through a network of intermediary servers, one or more of the intermediary servers may attempt to redirect the response data to a different client device attempting to present the response data to a different user and/or a different environment, the disclosed technique prevents this fraud because the different client device will not be able to answer the validation challenge correctly and thereby access the response data.

The techniques disclosed herein can be in any appropriate context in which it is desired to prevent illegitimate access to data. Purely to illustrate the present disclosure in more concrete terms, exemplary contexts are discussed below in which the data to be protected is advertising data or data for a travel application. It will be appreciated that these are non-limiting examples of contexts in which the techniques disclosed herein may be used, and that other contexts are possible.

In some implementations, one or more servers receives a data request that includes one or more attributes characterizing an environment of a client device to which requested data will be provided. The one or more servers select response data based on the one or more attributes and generate, using the one or more attributes characterizing the environment of the client device to which the requested data will be provided, a validation challenge that controls access to the response data based on whether the client device generates a correct answer to the validation challenge. Thus, providing the client device access to the response data when the answer generated by the client device correctly responds to the validation challenge and the client device validates the one or more attributes of the environment specified in the validation challenge, and preventing the client device from accessing the response data when the answer generated by the client device does not correctly respond to the validation challenge or the client device does not validate the one or more attributes of the environment specified in the validation challenge. The one or more servers secure the response data with the validation challenge and transmit the response data secured with the validation challenge to the client device.

The client device generates a challenge response and determines whether the challenge response is a valid response to the validation challenge. In response to determining that the challenge response is a valid response to the validation challenge, the client device accesses the response data.

In some implementations, providing the client device access to the response data includes providing, to the client device, executable code that enables the client device to access the response data on the client device when the client device generates a valid response to the validation challenge.

In some implementations, the one or more attributes include one or more of a public key of a browser of the client device, a public key of the client device, address of the client device, the server's cookie name and value, or an application name. In addition, in some implementations, generating the validation challenge includes generating a unique value, retrieving a public key of the client device, encrypting the unique value and one or more attributes of the request using the public key of the client device, and generating the validation challenge that includes the encrypted unique value and the one of the one or more attributes.

In some implementations the one or more servers secure the response data with the validation challenge by encrypting, using a public key of the client device, at least a portion of the response data. Furthermore, in some implementations, receiving the data request including the one or more attributes characterizing an environment of a client device to which requested data will be provided includes receiving the data request from an intermediary server that stores at least a portion of the one or more attributes.

In some implementations, the one or more servers transmit the response data secured with the validation challenge to the client device by extracting, from the data request, an address of the client device and transmitting the validation challenge to the address of the client device.

The details of one or more techniques of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1 depicts a communication sequence in accordance with techniques discussed in this disclosure.

FIG. 2 is a block diagram for securing response data with a validation challenge.

FIG. 3 shows a data structure that includes example attributes that can be included in the data request and received by the server.

FIG. 4 illustrates an example of a data structure that includes fields for a validation challenge.

Like reference numbers and designations in the various drawings indicate like elements.

DETAILED DESCRIPTION

Figure 5:
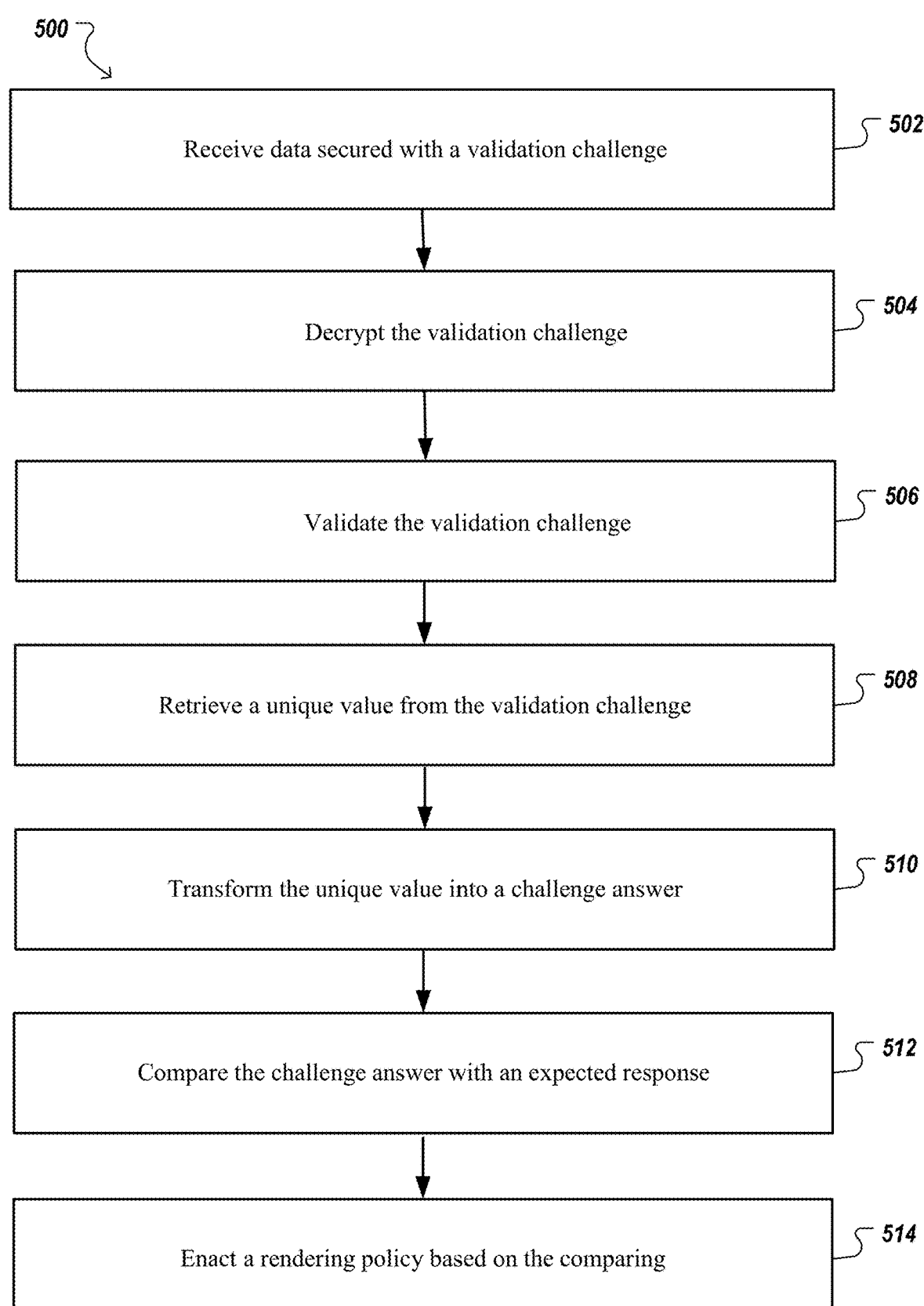
FIG. 5 is a block diagram of illustrative actions that the client device can perform to answer the validation challenge.

FIG. 1 shows a system 100 that depicts a communication sequence in accordance with techniques discussed in this disclosure. System 100 includes a client device 102. The client device 102 can be a smart phone, an electronic tablet, or another suitable client device. System 100 also includes one or more servers 104 for communicating with the client device. Specifically, one or more servers 104 receive a data request from the client and transmit a validation challenge that includes secured response data to client device 102. The data request is generated by a web browser or another application on the client device without and/or independently of any user input. The client device receives the validation challenge and submits the challenge response to an application 106 (e.g., to a browser or another application in which the response data is to be presented to the user).

FIG. 2 is a block diagram of process 200 for securing response data with a validation challenge. At 202, one or more servers (e.g., among servers 104) receives a data request including one or more attributes characterizing an environment of a client device to which the requested data will be provided. The data request can include one or more of a public key of a browser of the client device, a public key of the client device, address of the client device, a server's cookie name and value (e.g., a name and value of a cookie for a server that is serving a webpage in which the response data is to be presented), an application name and other suitable attributes. If the data request is received from the client device itself, the client device can determine which attributes of the environment need to be included in the data request.

In some implementations, the data request is generated by an intermediary server, because, for example, the intermediary server can have some information regarding the environment of the client device where the response data will be presented to the user. Specifically, if the response data is to be presented to the user within an application (e.g., within a game played on the client device), the client device may not be able to access the application to determine the environment where the response data will be presented, especially in cases where communications between the application and the server providing the data are encrypted. However, an intermediary server that is providing data to the application can have data regarding the environment. For example, if the application is a travel application, the server that is providing travel information to the application (e.g., in response to search request) has better data on environmental information where the response data will be presented. That is, if a user is searching for a specific travel location, that information is known to the intermediary server, but not the client device. Therefore, in these implementations, an intermediary server generates and transmits the data request. In some implementations, the intermediary server queries the client device for some attributes that the intermediary server may not have (e.g., a public key of the application on the client device).

Figure 3:
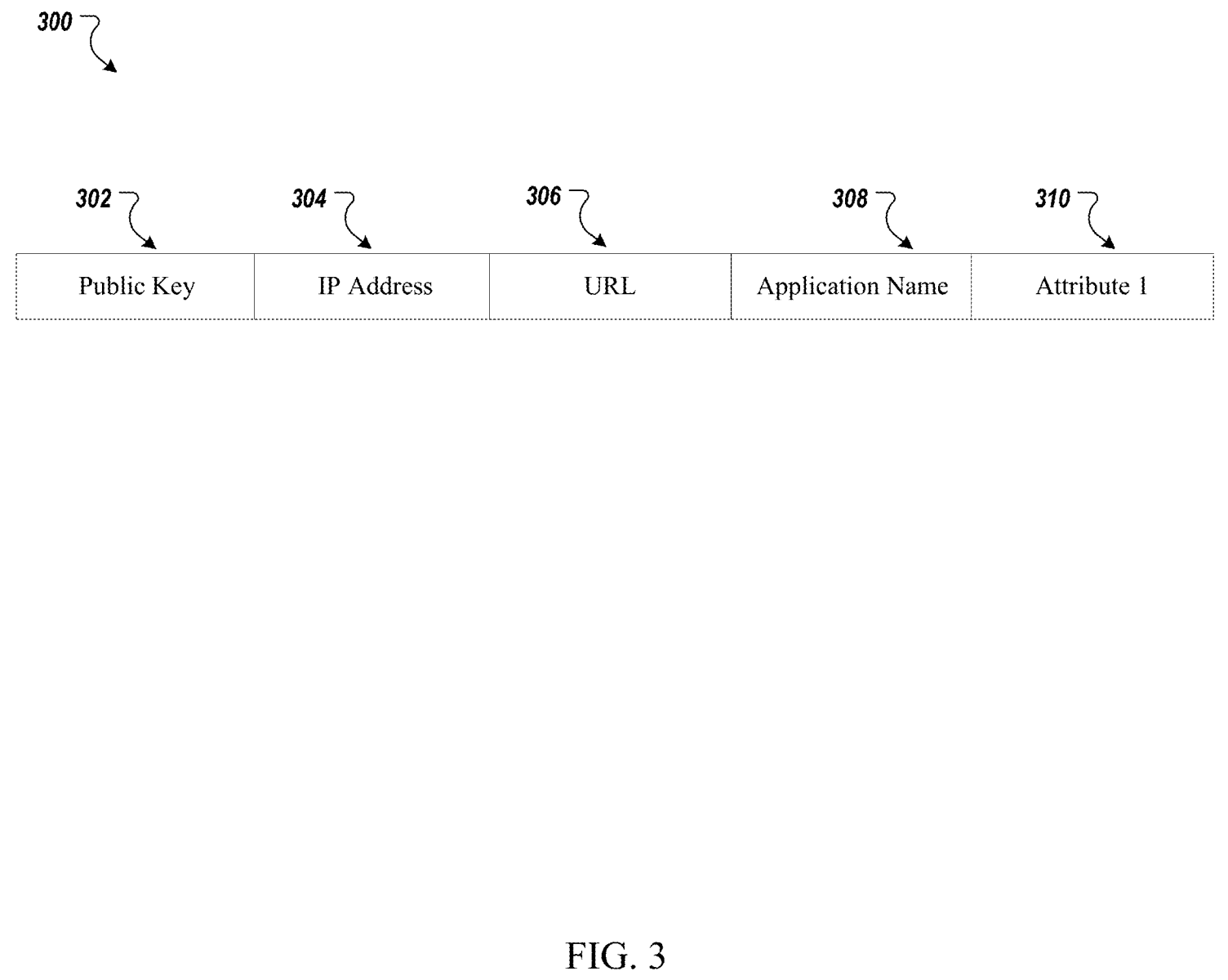

FIG. 3 shows a data structure 300 that includes example attributes that can be included in the data request and received by the server. Public key 302 is a public key that corresponds to the private key on the client device that the client device can use to decrypt the validation challenge. In some implementations, the public key is the public key of the device itself. In other implementations, the public key is the public key generated for an application in which the response data will be presented to the user. For example, a web browser can have a public/private key pair generated in addition to or instead of any client device public/private keys. Thus, if the application in which the response data (e.g., in response to the data request) will be presented is the browser, the data request can include the public key that corresponds to the private key within that browser. The server can use various implementations of public/private key infrastructure (PKI) to generate a public and private keys for the client device.

Internet Protocol (IP) Address 304 is the IP address of the client device to which the validation challenge can be sent. In the implementations where the request is received from the client device, the application on the client device that generates the data request can query the operating system of the client device for the IP address of the client device. In the implementations where the data request does not come from the client device, but comes from, for example, an intermediary server, the intermediary server can query the client device for the address or can determine the address of the client device based on the communications sent and received using the application in which the response data will be displayed.

Uniform Resource Locator (URL) 306 can be an address of a webpage in which the response data is to be displayed. For example, if the response data is to be displayed in a browser, the URL can inform the server of the context or type of the website and/or webpage as well as other information about the website and/or webpage. Application name 308 is an application name within which the response data is to be displayed. Field 310 can include one or more other attributes that can be received by the server as a part of the data request. The other attributes can include, for example, a context within the application. For a travel application, the context can be a travel location that the user has requested.

For a riding service application, the context can be a current location and a destination of the user, as well as other user preferences. In some implementations, other attribute fields can be added to the data structure 300.

Referring back to FIG. 2, at 204, the server (e.g., of servers 104) selects response data based on the one or more attributes. The response data can be a digital component. As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and can include advertising information, such that an advertisement is a type of digital component. In some implementations a digital component includes or can be inserted into a script for presenting the data of the digital component to the user. The script can include executable instructions for determining whether an answer for a validation challenge is correct.

In some implementations, the validation challenge can be used in an advertising context. That is, a web browser or another application on a client device (e.g., a smart phone or an electronic tablet) can request an advertisement to be sent to the client device for a presentation to a user. The server can select the advertisement based on the attributes (e.g., the environment in which the advertisement will be displayed) to transmit back to the client device. In some implementations, the advertisement is encapsulated into an advertisement script. The advertisement script including the selected advertisement can be the response data that is to be protected by the validation challenge.

In some implementations, the validation challenge can be used in a travel context. For example, a user device can generate a data request when the user desires to travel from a start position to an end position. The data request can include, as the one or more attributes, the start position and the end position. In addition, the data request can include other information about the user and the user device. When the server receives the data request, the server can select the response data (e.g., a digital component) to transmit to the client device. The digital component can include information about one or more vehicles available for the user. The digital component can include other information required for the travel. Furthermore, the challenge validation process can be used for the drivers in the travel context. That is, a client device of the driver can generate a data request that indicates to the server that the driver is available for a driving action with the attributes of the driver's environment sent to the server. The attributes can include the location of the driver, identification of the driver, the public key of the driver's client device, and other suitable attributes including any of the attributes discussed above.

Referring back to FIG. 2, at 206, the server (e.g., of servers 104) generates a validation challenge that controls access to the response data. The validation challenge controls access to the response data based on whether the client device generates a correct answer to the validation challenge. Specifically, the client device is provided access to the response data when the answer generated by the client device correctly responds to the validation challenge. The client device is prevented from accessing the response data when the answer generated by the client device does not correctly respond to the validation challenge. The server can generate a validation challenge in various ways. In some implementations, the server can use encryption to generate the validation challenge. The server can generate a unique value. The unique value can be, for example, a numeric value (e.g., multi-digit number), a hexadecimal value, a word, a phrase, or another suitable unique value. For example, the server can use a random number generator to generate the unique value in combination with one or more algorithms.

In some implementations, the unique value can be generated using one or more parameters of the request. For example, the server can use an IP address from the request, a hash of the URL from the request, and/or an application name from the request to generate the unique value. Below is an example data structure for the unique value:

```
{ Unique value: ...
  IP Address: ...
  Application name: ...}
```

The data structure can be stored as a JavaScript Object Notation (JSON)-like format. In some implementations, to reduce the size of the data structure, a binary encoding scheme (e.g., protocol buffer or cbor http://cbor.io) can be adapted.

In some implementations, the server retrieves or receives a public key of the client device. As discussed above, the public key of the client device can be included in the data request, thus, the server can retrieve the public key of the client device from the request. In some implementations, the server can retrieve the public key from the client device by querying the client device itself. In another example, the server can retrieve the public key of the client device from the intermediary server. In the implementations, where the key that is needed is from a specific application on the client device, the client device may not have access to that key, but instead the intermediary server can store the key. Thus, the server can retrieve the public key from the intermediary server.

When the server obtains the public key of the client device and generates the unique value, the server encrypts the unique value using the public key of the client device. The encrypted unique value becomes part of the validation challenge. In addition, the server can generate a cryptographic hash of the generated unique value. The server can execute a cryptographic hash function, such as a Secure Hash Algorithm (SHA) function, against the unique value to generate a cryptographic hash. The server adds the cryptographic hash of the unique value to the validation challenge. The cryptographic hash becomes an expected response.

In some implementations, the cryptographic hash is added to a script or other executable code for comparison on the client device. For example, the script can be executable code that enables the client device to access the response data on the client device when the client device generates a valid response to the validation challenge. The client device can execute the script when answering the validation challenge. In some implementations, the server encrypts one or more of the attributes received in the data request using the public key of the client device. The client device can decrypt the attributes and use those attributes to validate the validation challenge itself. That is, the client device can determine whether the validation challenge is in response to a specific data request received by the server.

Referring back to FIG. 2, at 208, the server (e.g., of servers 104) secures the response data with the validation challenge. For example, the server can generate a response package in response to the data request that includes the response data and the validation challenge (e.g., including the unique value encrypted using the public key of the client device, the expected response that includes a cryptographic hash of unique value, and in some implementations, attributes received in the data request encrypted using the public key of the client device). The response package can include other data. As discussed above, a digital component can be response data or a portion of the response data. In some implementations, in addition or instead of adding an expected response to the validation challenge, the server can encrypt at least a portion of the response data using a symmetric key encryption algorithm or using the public key of the client device (e.g., the key of the browser of the client device). The client device can decrypt the response data using the same symmetric key encryption algorithm using the unique value returned by the client device as the decryption key. If the portion of the response data is encrypted using the public key of the client device, the client device can use a corresponding private key to decrypt the portion of the response data.

In an advertising context, the response data can include a script (e.g., an advertising script) that includes within the script, in addition to executable code, an advertisement to be presented to the user. In a travel context, the response data can include a digital component with driver/vehicle information for a vehicle that can carry the user from a start point to an end point specified in the data request. In the driver side traveling context, the response data can include a digital component with passenger information for the driver to carry the passenger from a desired start point to a desired end point. In all the contexts, the response data can be encapsulated in a script and/or encrypted using a public key of the client device.

Figure 4:
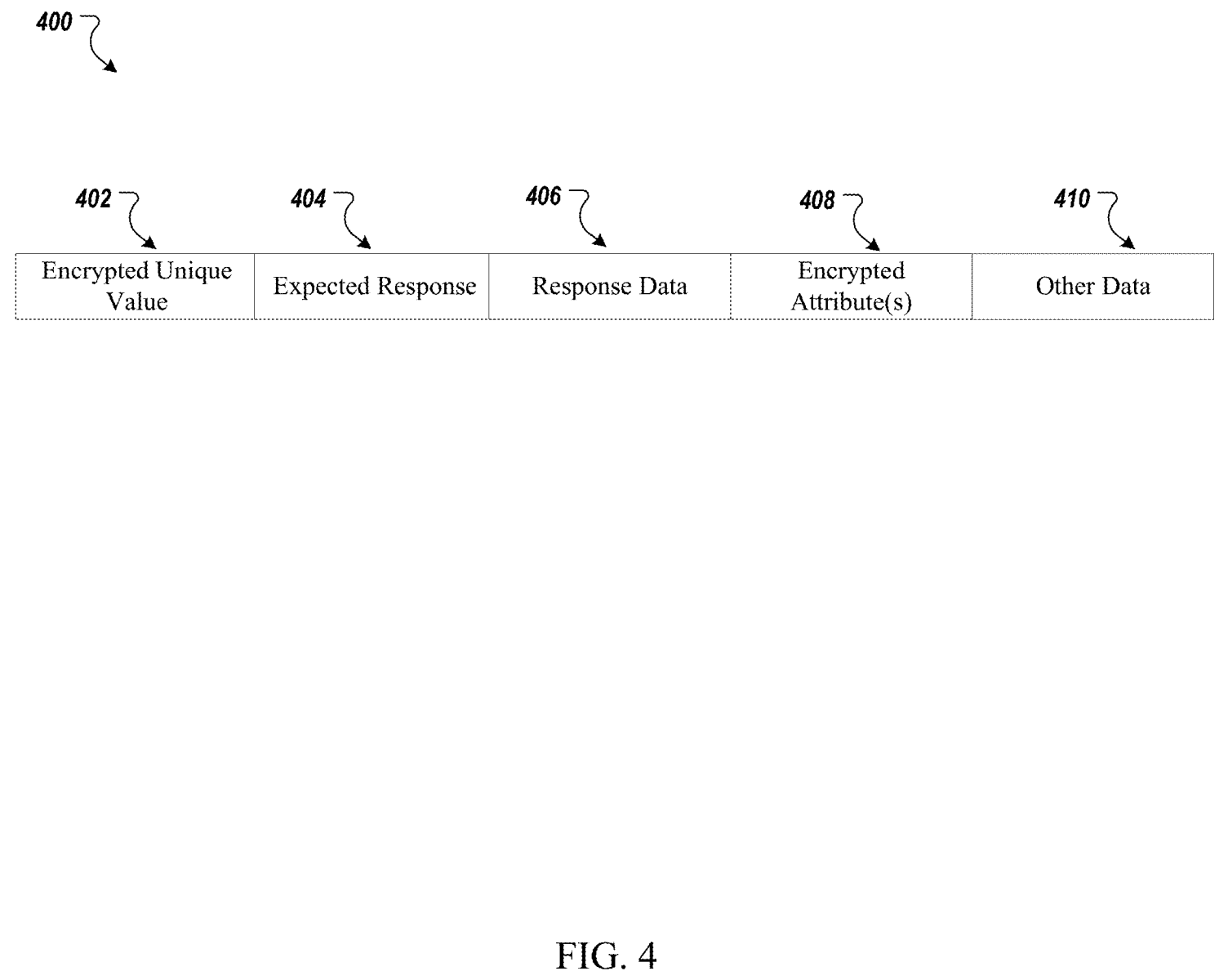

In some implementations, the server encrypts (e.g., using a public key of the client device) at least a portion of the response data. Encryption of the response data can be useful to prevent a system or an application on the client device or at an intermediary server to bypass the script or attempt to defeat the validation challenge by attempting to extract the response data. The client device can decrypt the encrypted portion of the response data before presenting the response data to the user. FIG. 4 illustrates an example of a data structure 400 that includes fields in a validation challenge. Field 402 includes the encrypted unique value (e.g., encrypted using a public key of the client device). Field 404 includes an expected response (e.g., a cryptographic hash of the unique value). Field 406 includes the response data. For example, field 406 can include a digital component. In some implementations, fields 404 and 406 are a single field that stores a script that includes the expected response and the response data. Field 408 stores one or more encrypted attributes received in the request. As discussed above, the attributes can be used to validate the validation challenge on the client device. As illustrated by field 410, other data can be included in the data structure 400.

Referring back to FIG. 2, at 210, the server (e.g., of servers 104) transmits the response secured with the validation challenge to the client device. In some implementations, the server extracts an address of the client device (e.g., an IP address) from the request and transmits the validation challenge to the address of the client device. In some implementations, the server may not have access to the address of the client device. For example, if the original data request was received from an intermediary server, the server can transmit the validation challenge to the intermediary server to be eventually received at the client device. In some implementations, the response data transmitted to (e.g., provided to) the client device includes executable code that enables the client device to access the response data on the client device when the client device generates a valid response to the validation challenge.

In some implementations, the server transmits the validation challenge through a number of intermediary servers. One or more of the intermediary servers may attempt to intercept the response data and redirect the response data to a different client device. However, because the encryption has been performed using a public key of the specific client device, only that client device will be able to answer the validation challenge correctly and access the response data.

In some implementations, it may be useful to reduce the size of the validation challenge for transmission (e.g., over slower networks). In these and other implementations, the validation challenge can include an encrypted unique value without the attributes discussed above (e.g., without address, application name, or other suitable attributes). The response data can be encrypted using a symmetric key encryption algorithm (e.g., an Advanced Encryption Standard algorithm) with the unique value action as the encryption key for the algorithm. This implementation can be useful because the valid client device will have all the other attribute information that can be combined with the decrypted unique value to access the response data. Additionally, the validation challenge itself can be encrypted using a symmetric key encryption algorithm. To use the symmetric key encryption algorithm to encrypt the validation challenge the request should be a web request (e.g., a request for a digital component to be included in a web page). Other requirements can include a cookie dropped into the browser's cookie store by the server, that the server recognizes the browser via the server's own cookie through a cookie matching process, that the server properly marked the server's cookies to prevent cookie theft and that the server has not shared the server's cookie values with other parties. Also, the server should have sufficient entropy in the server's cookie values to uniquely identify each browser and so that other parties are unable to determine the server's cookie values. In some implementations, the server can be a part of a demand-side platform (DSP) advertising network and the response data can be an advertisement to be presented to the user on the client device.

FIG. 5 is a block diagram of actions that the client device can perform to answer the validation challenge. At 502, the client device receives data secured with a validation challenge. For example, the client device can receive the validation challenge from the server that generated the validation challenge or from an intermediary server. At 504, the client device decrypts the validation challenge using the client device's private key. When the validation challenge is correctly decrypted, the client device, is able to retrieve the data within the validation challenge. At 506, the client device validates the validation challenge. The client device compares the attributes received as part of the validation challenge with the attributes of the original data request generated by the client device or on behalf of the client device. If the attributes received in the validation challenge match the attributes of the data request (e.g., attributes of the environment), the client device determines that the validation challenge corresponds to the data request generated by the or on behalf of the client device. If the attributes received in the validation challenge do not match the attributes of the data request, the client device does not validate the validation challenge (e.g., stop processing the validation challenge and refrain from answering the validation challenge). At 508, the client device retrieves the unique value. As discussed above, the unique value can be, for example, a number, a phrase, a hexadecimal number, a multi-digit number, a word, or another suitable value. If a different client device receives the validation challenge together with the response data (e.g., because an intermediary server has fraudulently redirected the response (i.e., the response data and the validation challenge)), that different client device will not be able to correctly perform the decryption operation and answer the validation challenge correctly.

At 510, the client device transforms the unique value into a challenge answer. For example, the client device can execute a cryptographic hash algorithm on the unique value. The transformation method results in the same cryptographic hash value as the expected response when the unique value is correct (i.e., when the unique value is representative of the context in which the response data will be used, as specified in the request). In some implementations, the transformation method is synchronized with the server transformation method (e.g., via the same cryptographic hashing algorithm). When the unique value is not correct, the transformation method does not result in the same cryptographic hash value as the expected response, indicating that the context of the client device differs from that specified in the request.

Figure 6:
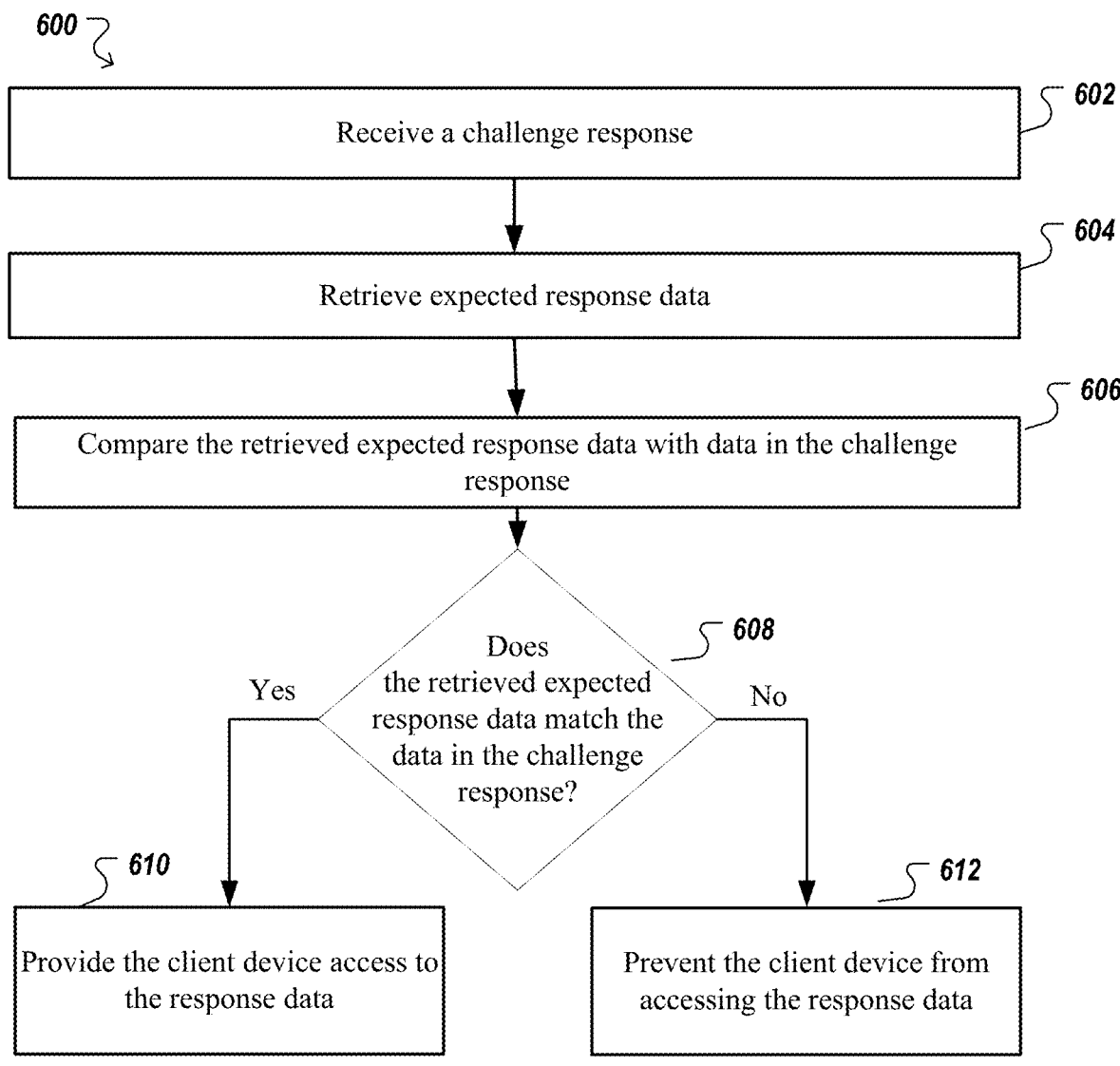
FIG. 6 illustrates actions that the script can perform to determine whether to provide or prevent access to the response data.

At 512, the client device compares the challenge answer with an expected response. In some implementations, the client device can retrieve a script that was received as part of the validation package and execute a script to perform the comparison. The client device can submit the transformed unique value to the script. FIG. 6 illustrates actions that the script can perform to determine whether to provide or prevent access to the response data. At 602, the script receives a challenge response. For example, the script can receive, as input, a cryptographic hash of the decrypted unique value. At 604, the script retrieves expected response data. For example, the script can retrieve the cryptographic hash of the unique value hashed on the server.

At 606, the script compares the retrieved expected response data with the challenge response, which is also referred to as an answer generated by the client device. For example, the script can compare two cryptographic hashes. At 608, the script determines whether the retrieved expected response data (e.g., a cryptographic hash generated by the server) matches the data in the challenge response (e.g., the cryptographic hash generated on the client device). If the cryptographic hashes match, process 600 moves to 610, where the script provides the client device access to the response data. If the cryptographic hashes do not match, process 600 moves to 612, where the script prevents the client device from accessing the response data. Thus, the client device generates the challenge response, determines, whether the challenge response is a valid response to the validation challenge, and in response to determining that the challenge response is a valid response to the validation challenge, accesses the response data.

When the answer generated by the client device correctly responds to the validation challenge and the client device validates the one or more attributes of the environment specified in the validation challenge, the client device is provided access to the response data. However, when the answer generated by the client device does not correctly respond to the validation challenge or the client device does not validate the one or more attributes of the environment specified in the validation challenge, the client device is prevented from accessing the response data.

In the implementations where at least a portion of the response data is encrypted, the client device (e.g., the script)

can decrypt that data, for example, using a symmetric key encryption algorithm (e.g., Advanced Encryption Standard (AES)). These implementations may require that the request be a web request (e.g., a request for a digital component to be included in a web page). Other requirements can include a cookie dropped into the browser's cookie store by the server, that the server recognizes the browser via the server's own cookie through a cookie matching process, that the server properly marked the server's cookies to prevent cookie theft and that the server has not shared the server's cookie values with other parties. Also, the server should have sufficient entropy in the server's cookie values to uniquely identify each browser and so that other parties are unable to determine the server's cookie values. In some implementations, the server can be a part of a demand-side platform (DSP) advertising network and the response data can be an advertisement to be presented to the user on the client device.

In the implementations where at least a portion of the response data is encrypted using a symmetric key encryption algorithm, the client device can use the decrypted unique number as a decryption key for the response data. That is, the client device can decrypt the response data using the symmetric key encryption algorithm with the unique data being the decryption key.

Referring back to FIG. 5, at 514, the client device enacts a rendering policy based on the comparing. As discussed above, the challenge validation system can be implemented in many different scenarios. The rendering policy can be used to render any type of data in a browser or another application. For example, if the application is a game application, additional game data can be rendered inside the game. In another example, if the challenge validation system is implemented in an advertising context, the system can include various other component and steps. For example, the original data request can include an advertisement identifier of the client device. An advertisement identifier unique identifies the device to other systems without needing device or user specific information. The script, in the advertising context, can be an advertisement script that enables access to the advertisement. Thus, the rendering policy enables the advertisement to be presented to the user in under the appropriate environment. That is, the rendering policy can enable or prevent the advertisement from being presented to the user based on whether the environment where the advertisement is to be presented matches the attributes in the original data request. In some implementations, if the cryptographic hashes do not match, the rendering policy can indicate that a placeholder should be rendered.

If the challenge validation system is implemented in a traveling context, the response data can be a digital component that includes driver information that is available to drive the user of the client device from a start position to an end position indicated in the original data request. In some implementations, when the validation challenge is correctly answered, the client device can be enabled for contacting the driver of the vehicle or getting updates on the progress of the vehicle.

In some implementations, the validation challenge system can be implemented using one or more application programming interfaces (API). An API can be built that can be installed on both the client device and the server. Additionally, or alternatively, two APIs can be built, one for a server and another for a client device. The validation challenge system on the client device can include programing to submit to the API on the server side the data request. In addition, execution code can be created for an intermediary server to submit data requests to the server. A second API can be created for the server to receive data requests, generate validation challenges, and transmit the validation challenge to the client device. This API can be combined with the request API in some implementations.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on an electronic device having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:

receiving, by one or more servers having one or more processors, a data request specifying attributes including one or more of (i) a webpage address of a webpage or (ii) an application name of an application as an environment of a client device at which response data provided, by the one or more servers responsive to the data request, will be presented;

selecting, by the one or more servers, the response data based on the attributes, including at least the one or more of the webpage address or the application name;

generating, by the one or more servers and using the one or more of the address of the webpage or the application name, a validation challenge that is required to be correctly answered by the client device to access the response data, wherein generating the validation challenge comprises:

generating a unique value;

retrieving a public key of the client device;

encrypting the unique value and one or more of the attributes of the data request with the public key of the client device; and generating the validation challenge that includes the encrypted unique value and the one of the one or more attributes;

securing, by the one or more servers, the response data with the validation challenge, wherein securing the response data prevents access to the response data absent the answer generated by the client device being a correct answer to the validation challenge;

providing, by the one or more servers and to the client device, a response package that includes (i) the response data secured by the validation challenge, (ii) a set of attributes, and (iii) first executable code configured to cause the client device to access and present the response data within the webpage or the application only in response to (i) a determination that the answer generated by the client device is the correct answer to the validation challenge and (ii) matching the set of attributes in the response package with the attributes originally included in the data request; and transmitting, by the one or more servers, the response package to the client device prior to the client device answering the validation challenge.

2. The method of claim 1, wherein the data request further specifies one or more of a public key of a browser of the client device, a public key of the client device, address of the client device, or a server's cookie value.

3. The method of claim 1, wherein securing, by the one or more servers, the response data with the validation challenge comprises encrypting, using a public key of the client device, at least a portion of the response data.

4. The method of claim 1, wherein receiving the data request comprises receiving the data request from an intermediary to which the client device provided the data request.

5. The method of claim 1, wherein transmitting, by the one or more servers, the response package to the client device comprises:

extracting, from the data request, an address of the client device; and transmitting the response package to the address of the client device.

6. The method of claim 1, further comprising generating the response package to include the (i) the response data secured by the validation challenge, (ii) a set of attributes, (iii) first executable code, (iv) a unique value generated by the server, and (v) second executable code that causes the client device to transform the unique value generated by the server into the answer to the validation challenge and compare the answer to the correct answer to the validation challenge.

7. A non-transitory computer storage medium encoded with a computer program, the program comprising instructions that when executed by data processing apparatus cause the data processing apparatus to perform operations comprising:

receiving a data request specifying attributes including one or more of (i) a webpage address of a webpage or (ii) an application name of an application as an environment of a client device at which response data provided, by the one or more servers responsive to the data request, will be presented in a graphical user interface;

selecting the response data based on the attributes, including at least the one or more of the webpage address or the application name;

generating, using the one or more of the address of the webpage or the application name, a validation challenge that is required to be correctly answered by the client device to access the response data; securing the response data with the validation challenge, wherein securing the response data prevents access to the response data absent the answer generated by the client device being a correct answer to the validation challenge, wherein generating the validation challenge comprises:

generating a unique value;

retrieving a public key of the client device;

encrypting the unique value and one or more of the attributes of the data request with the public key of the client device; and generating the validation challenge that includes the encrypted unique value and the one of the one or more attributes;

providing, to the client device, a response package that includes (i) the response data secured by the validation challenge, (ii) a set of attributes, and (iii) first executable code configured to cause the client device to access and present the response data within the webpage or the application only in response to (i) a determination that the answer generated by the client device is the correct answer to the validation challenge and (ii) matching the set of attributes in the response package with the attributes originally included in the data request; and transmitting the response package to the client device prior to the client device generating an answer to the validation challenge.

8. The non-transitory computer storage medium of claim 7, wherein the data request further specifies one or more of a public key of a browser of the client device, a public key of the client device, address of the client device, or a server's cookie value.

9. The non-transitory computer storage medium of claim 7, wherein securing the response data with the validation challenge comprises encrypting, using a public key of the client device, at least a portion of the response data.

10. The non-transitory computer storage medium of claim 7, wherein receiving the data request comprises receiving the data request from an intermediary to which the client device provided the data request.

11. The non-transitory computer storage medium of claim 7, wherein transmitting, by the one or more servers, the response package to the client device comprises:

extracting, from the data request, an address of the client device; and transmitting the response package to the address of the client device.

12. The non-transitory computer storage medium of claim 7, wherein the instructions cause the data processing apparatus to perform operations further comprising generating the response package to include the (i) the response data secured by the validation challenge, (ii) a set of attributes, (iii) first executable code, (iv) a unique value generated by the server, and (v) second executable code that causes the client device to transform the unique value generated by the server into the answer to the validation challenge and compare the answer to the correct answer to the validation challenge.

13. A system comprising:

one or more servers including one or more processors;

one or more memory devices coupled to one or more memory devices, wherein the one or more servers are configured to perform operations comprising:

receiving a data request specifying attributes including one or more of (i) a webpage address of a webpage or (ii) an application name of an application as an environment of a client device at which response data provided, by the one or more servers responsive to the data request, will be presented in a graphical user interface;

selecting the response data based on the attributes, including at least the one or more of the webpage address or the application name;

generating, using the one or more of the address of the webpage or the application name, a validation challenge that is required to be correctly answered by the client device to access the response data, wherein generating the validation challenge comprises:

generating a unique value;

retrieving a public key of the client device;

encrypting the unique value and one or more of the attributes of the data request with the public key of the client device; and generating the validation challenge that includes the encrypted unique value and the one of the one or more attributes;

securing the response data with the validation challenge, wherein securing the response data prevents access to the response data absent the answer generated by the client device being a correct answer to the validation challenge; providing, to the client device, a response package that includes (i) the response data secured by the validation challenge, (ii) a set of attributes, and (iii) first executable code configured to cause the client device to access and present the response data within the webpage or the application only in response to (i) a determination that the answer generated by the client device is the correct answer to the validation challenge and (ii) matching the set of attributes in the response package with the attributes originally included in the data request; and transmitting the response package to the client device prior to the client device generating an answer to the validation challenge.

14. The system of claim 13, wherein the data request further specifies one or more of a public key of a browser of the client device, a public key of the client device, address of the client device, or a server's cookie value.

15. The system of claim 13, wherein securing the response data with the validation challenge comprises encrypting, using a public key of the client device, at least a portion of the response data.

16. The system of claim 13, wherein receiving the data request comprises receiving the data request from an intermediary to which the client device provided the data request.

17. The system of claim 13, wherein transmitting, by the one or more servers, the response package to the client device comprises:

extracting, from the data request, an address of the client device; and transmitting the response package to the address of the client device.

18. The system of claim 13, wherein the one or more servers are configured to perform operations further comprising generating the response package to include the (i) the response data secured by the validation challenge, (ii) a set of attributes, (iii) first executable code, (iv) a unique value generated by the server, and (v) second executable code that causes the client device to transform the unique value generated by the server into the answer to the validation challenge and compare the answer to the correct answer to the validation challenge.

* * * * *